J. A. ROURKE.
BALL JOINT FOR PIPES.
APPLICATION FILED MAY 1, 1912.

1,041,515.

Patented Oct. 15, 1912.

WITNESSES

INVENTOR
JAMES A. ROURKE
BY HIS ATTORNEY

UNITED STATES PATENT OFFICE.

JAMES A. ROURKE, OF SAVANNAH, GEORGIA.

BALL-JOINT FOR PIPES.

1,041,515.  Specification of Letters Patent.  Patented Oct. 15, 1912.

Application filed May 1, 1912. Serial No. 694,539.

*To all whom it may concern:*

Be it known that I, JAMES A. ROURKE, a citizen of the United States, residing in Savannah, Georgia, have invented certain Improvements in Ball-Joints for Pipes, of which the following is a specification.

My invention consists of a certain improvement in the ball and socket joints used for connecting adjoining sections of pipe, in cases where the circumstances are such that said adjoining sections must be free to swing in respect to one another, as for instance in the case of pipes employed in connection with suction or other dredges.

My invention relates particularly to the socket member of such a joint, and the purpose of the invention is to provide a better and more extended bearing between the ball and the socket than in any previous construction with which I am familiar, and thereby prevent fracture of the socket member in the event of adjoining sections of the pipe being driven forcibly toward each other, such fractures often resulting when the contact area of the bearing between the ball and socket members is limited and concentrated in a certain portion of the socket.

Figure 1:
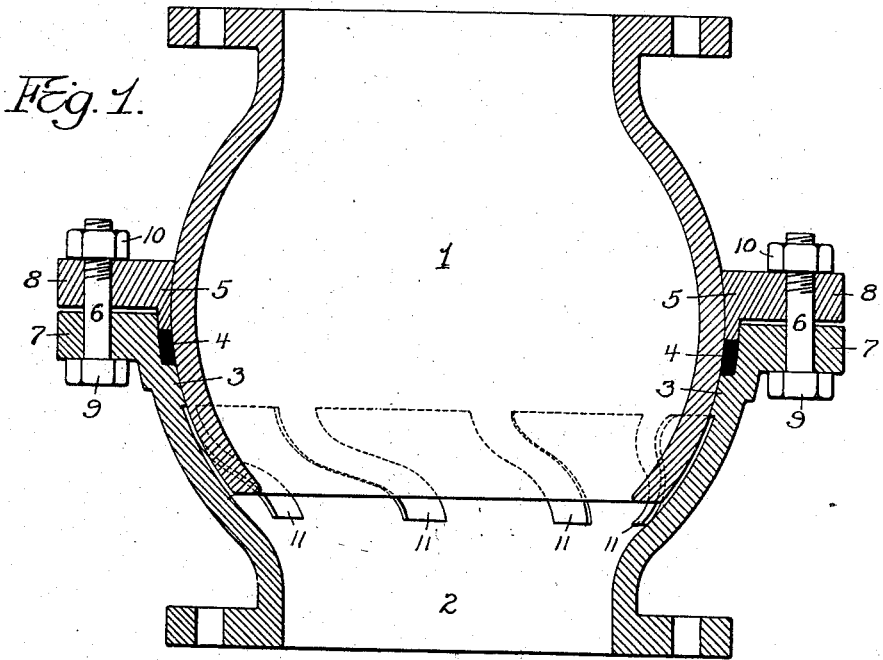
Figure 2:
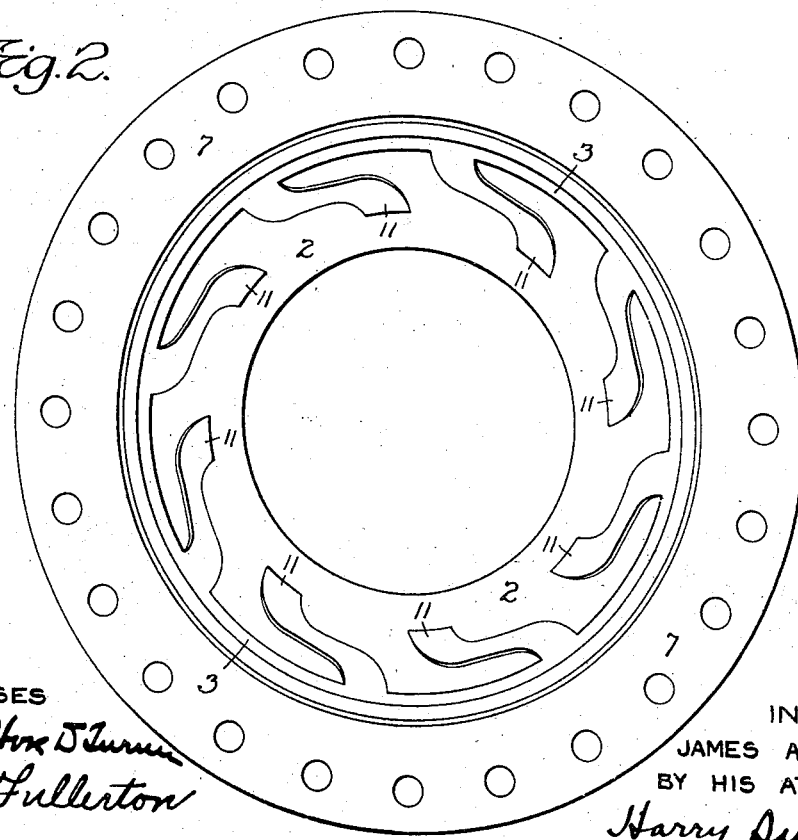

In the accompanying drawing—Figure 1 is a longitudinal sectional view of a ball-and-socket joint for pipes constructed in accordance with my invention, and Fig. 2 is an end view of the socket member of the joint.

In the drawing, 1 represents the ball member of the joint and 2 the socket member of the same, the ball having its bearing against an internal annular rib 3 near the mouth of the socket member, and also against a packing ring 4 and a gland 5, the ring 4 resting upon the rib 3 and the gland 5, serving to confine said ring in position upon the rib.

The gland 5 is secured in place by means of bolts 6 passing through a flange 7 at the mouth of the socket and through a corresponding flange 8 on the gland, each bolt having a head 9 and nut 10, and the gland overlying the ball 1 to such an extent as to prevent separation of the members of the joint.

So far as described, my invention is similar to ball and socket joints in common use, but in practice it has been found that where the contact area between the ball and socket members of the joint is limited to the relatively narrow annular rib 3 forcible movement of adjoining sections of the pipe toward each other will cause the shock or strain of such movement to be concentrated upon that portion of the socket member carrying the said rib 3, with the result that very often the socket is fractured and the joint thereby rendered inoperative until the socket has been replaced. Obviously, this objection might be overcome by causing the ball to contact with the socket throughout the entire surface of that portion of the ball which projected inwardly beyond the packing ring 4, but such construction is inadmissible because of the friction which would thereby be caused between the two members of the joint and which would render the joint too stiff. I have found that the objection can be effectively overcome by providing, on the concave inside face of the socket, ribs 11, which extend longitudinally inward from the rib 3 and are of the same thickness as the latter, so as to present inner faces flush with that of the rib and thereby provide at intervals around the socket bearing faces which supplement that of the rib and serve to distribute throughout almost the entire area of the socket any shocks or strains due to sudden movement of the ball and socket members toward each other, thereby enabling the socket member to withstand such shocks or strains without risk of fracture.

By preference, the ribs 11 are curved so that the terminal end of one rib will be in line or thereabout longitudinally with the root end of the next adjoining rib, the purpose of this construction being to distribute the wear due to contact of the ball with the ribs 11 throughout almost the entire area of that portion of the ball which is longitudinally within the line of the rib 3, and thus overcome any tendency to wear channels in this portion of the ball. This formation of the ribs 11 also serves to distribute shocks or strains more uniformly throughout the extent of the socket member 2 than would be the case if the ribs 11 were parallel with the axial line of the socket.

I claim:

1. In a ball-and-socket joint for pipes, a socket member having an internal annular rib constituting a bearing for the ball member, and longitudinal ribs formed on the inside face of the socket and constituting additional bearings for the ball.

2. In a ball-and-socket joint for pipes, a socket member having an internal annular rib constituting a bearing for the ball member, and longitudinal ribs formed on the inside face of the socket and constituting additional bearings for the ball, said longitudinal ribs being curved transversely.

In testimony whereof, I have signed my name to this specification, in the presence of two subscribing witnesses.

JAMES A. ROURKE.

Witnesses:
J. E. TAYLOR,
L. E. EDWARDS.

Copies of this patent may be obtained for five cents each, by addressing the "Commissioner of Patents, Washington, D. C."